United States Patent
Houle

(10) Patent No.: US 11,247,579 B2
(45) Date of Patent: Feb. 15, 2022

(54) SYSTEM AND METHOD FOR MODULATING A CHARGING RATE FOR CHARGING A BATTERY OF A VEHICLE AS A FUNCTION OF AN EXPECTED PASSENGER LOAD

(71) Applicant: Bombardier Transportation GmbH, Berlin (DE)

(72) Inventor: Martin Houle, Laval (CA)

(73) Assignee: Bombardier Transportation GmbH, Berlin (DE)

( * ) Notice: Subject to any disclaimer, the term of this patent is extended or adjusted under 35 U.S.C. 154(b) by 242 days.

(21) Appl. No.: 16/722,035

(22) Filed: Dec. 20, 2019

(65) Prior Publication Data

US 2020/0198491 A1 Jun. 25, 2020

Related U.S. Application Data

(60) Provisional application No. 62/782,516, filed on Dec. 20, 2018.

(51) Int. Cl.
*H02J 7/00* (2006.01)
*H02J 7/24* (2006.01)
*B60L 53/62* (2019.01)

(52) U.S. Cl.
CPC ........ *B60L 53/62* (2019.02); *H02J 7/007188* (2020.01); *B60L 2200/18* (2013.01); *B60L 2240/72* (2013.01)

(58) Field of Classification Search
USPC ....................................................... 320/109
See application file for complete search history.

(56) References Cited

U.S. PATENT DOCUMENTS

| | | | |
|---|---|---|---|
| 6,381,522 B1 | 4/2002 | Watanabe et al. | |
| 9,955,428 B1* | 4/2018 | Bacarella | H02J 7/005 |
| 2007/0067065 A1* | 3/2007 | El-Gasseir | H02J 3/008 |
| | | | 700/286 |
| 2011/0016063 A1* | 1/2011 | Pollack | B60L 53/18 |
| | | | 705/412 |
| 2012/0245750 A1* | 9/2012 | Paul | B60L 53/65 |
| | | | 700/291 |
| 2013/0002188 A1* | 1/2013 | Uyeki | H01M 10/48 |
| | | | 320/101 |
| 2013/0119939 A1* | 5/2013 | Yonezawa | H02J 7/0091 |
| | | | 320/134 |

(Continued)

FOREIGN PATENT DOCUMENTS

| | | |
|---|---|---|
| DE | 102005024403 A1 | 1/2007 |
| DE | 102013201563 A1 | 7/2014 |

(Continued)

*Primary Examiner* — Alexis B Pacheco
(74) *Attorney, Agent, or Firm* — The Webb Law Firm

(57) ABSTRACT

A system and a method for managing a charging station allow charging a battery of a connected autonomous electric vehicle for carrying passengers in a controlled environment. A controller connected to the charging station determines and modulates a charging rate with which the charging station charges the battery based on a duration between a start of charging the vehicle and a forecasted time of start of duty mode of the vehicle. The duration is determined by the controller based on a forecasted passenger load as a function of time.

20 Claims, 12 Drawing Sheets

(56) References Cited

U.S. PATENT DOCUMENTS

| | | | | |
|---|---|---|---|---|
| 2014/0236379 A1* | 8/2014 | Masuda | ............ | B60L 53/20 700/297 |
| 2018/0329374 A1* | 11/2018 | Kelly | ............ | G06Q 50/06 |
| 2019/0070970 A1* | 3/2019 | Chan | ............ | G05B 15/02 |

FOREIGN PATENT DOCUMENTS

| | | | |
|---|---|---|---|
| EP | 2849312 A1 | 3/2015 | |
| GB | 2516383 A | 1/2015 | |
| WO | 2015049969 A1 | 4/2015 | |

* cited by examiner

Paris Charles-de-Gaulle

Montreal Trudeau

|  | Vehicles in duty mode | | | | Vehicles in idle mode | | | | Vehicles charging times and rates | | | | |
|---|---|---|---|---|---|---|---|---|---|---|---|---|---|
| Time | W | X | Y | Z | W | X | Y | Z | W | X | Y | Z | Charging rate (kW) |
| 04:00 |  |  |  |  |  |  |  |  |  |  |  |  | 67 |
| 05:00 |  |  |  |  |  |  |  |  |  |  |  |  | 67 |
| 06:00 |  |  |  |  |  |  |  |  |  |  |  |  | 67 |
| 07:00 |  |  |  |  |  |  |  |  |  |  |  |  | 67 |
| 08:00 |  |  |  |  |  |  |  |  |  |  |  |  | 67 |
| 09:00 |  |  |  |  |  |  |  |  |  |  |  |  | 67 |
| 10:00 |  |  |  |  |  |  |  |  |  |  |  |  | 67 |
| 11:00 |  |  |  |  |  |  |  |  |  |  |  |  | 67 |
| 12:00 |  |  |  |  |  |  |  |  |  |  |  |  | 67 |
| 13:00 |  |  |  |  |  |  |  |  |  |  |  |  | 67 |
| 14:00 |  |  |  |  |  |  |  |  |  |  |  |  | 67 |
| 15:00 |  |  |  |  |  |  |  |  |  |  |  |  | 67 |
| 16:00 |  |  |  |  |  |  |  |  |  |  |  |  | 100 |
| 17:00 |  |  |  |  |  |  |  |  |  |  |  |  | 100 |
| 18:00 |  |  |  |  |  |  |  |  |  |  |  |  | 200 |
| 19:00 |  |  |  |  |  |  |  |  |  |  |  |  | 50 |
| 20:00 |  |  |  |  |  |  |  |  |  |  |  |  | 100 |
| 21:00 |  |  |  |  |  |  |  |  |  |  |  |  | 100 |
| 22:00 |  |  |  |  |  |  |  |  |  |  |  |  | 50 |
| 23:00 |  |  |  |  |  |  |  |  |  |  |  |  | 50 |
| 00:00 |  |  |  |  |  |  |  |  |  |  |  |  | 50 |
| 01:00 |  |  |  |  |  |  |  |  |  |  |  |  | 67 |
| 02:00 |  |  |  |  |  |  |  |  |  |  |  |  | 67 |
| 03:00 |  |  |  |  |  |  |  |  |  |  |  |  | 67 |

Figure 10

|  | Vehicles in duty mode | | | | Vehicles in idle mode | | | | Vehicles charging times and rates | | | | |
|---|---|---|---|---|---|---|---|---|---|---|---|---|---|
| Time | W | X | Y | Z | W | X | Y | Z | W | X | Y | Z | Charging rate (kW) |
| 04:00 |   | ■ |   |   | ■ |   | ■ | ■ | ■ |   |   |   | 67 |
| 05:00 |   | ■ |   |   | ■ |   | ■ | ■ | ■ |   |   |   | 67 |
| 06:00 |   | ■ | ■ |   | ■ |   |   | ■ | ■ |   |   |   | 67 |
| 07:00 | ■ | ■ | ■ |   |   |   |   | ■ |   |   |   | ■ | 100 |
| 08:00 | ■ | ■ | ■ |   |   |   |   | ■ |   |   |   | ■ | 100 |
| 09:00 | ■ | ■ | ■ |   |   |   |   |   |   |   |   | ■ | 100 |
| 10:00 | ■ |   | ■ | ■ |   |   |   |   |   | ■ |   |   | 200 |
| 11:00 | ■ |   | ■ | ■ |   |   |   |   | ■ |   |   |   | 200 |
| 12:00 | ■ |   |   | ■ |   | ■ |   |   |   |   | ■ |   | 50 |
| 13:00 | ■ |   |   | ■ |   | ■ |   |   |   |   | ■ |   | 50 |
| 14:00 | ■ |   |   | ■ |   | ■ |   |   |   |   | ■ |   | 50 |
| 15:00 | ■ |   |   | ■ |   | ■ |   |   |   |   | ■ |   | 50 |
| 16:00 | ■ | ■ |   |   |   |   | ■ | ■ |   |   |   | ■ | 100 |
| 17:00 | ■ | ■ |   |   |   |   | ■ | ■ |   |   |   | ■ | 100 |
| 18:00 |   | ■ |   |   | ■ |   | ■ | ■ | ■ |   |   |   | 200 |
| 19:00 | ■ |   | ■ |   |   | ■ |   | ■ |   | ■ |   |   | 50 |
| 20:00 |   | ■ | ■ |   | ■ |   |   | ■ | ■ |   |   |   | 100 |
| 21:00 |   | ■ | ■ |   | ■ |   |   | ■ | ■ |   |   |   | 100 |
| 22:00 |   |   | ■ | ■ | ■ | ■ |   |   |   | ■ |   |   | 50 |
| 23:00 | ■ |   |   | ■ |   | ■ | ■ |   |   | ■ |   |   | 50 |
| 00:00 | ■ |   |   | ■ |   | ■ | ■ |   |   | ■ |   |   | 50 |
| 01:00 | ■ |   |   |   |   | ■ | ■ | ■ |   |   | ■ |   | 67 |
| 02:00 | ■ |   |   |   |   | ■ | ■ | ■ |   |   | ■ |   | 67 |
| 03:00 | ■ |   |   |   |   | ■ | ■ | ■ |   |   | ■ |   | 67 |

Figure 12

SYSTEM AND METHOD FOR MODULATING A CHARGING RATE FOR CHARGING A BATTERY OF A VEHICLE AS A FUNCTION OF AN EXPECTED PASSENGER LOAD

CROSS-REFERENCE TO RELATED APPLICATION

This application claims priority to U.S. Provisional Application No. 62/782,516, filed on Dec. 20, 2018, the disclosure of which is hereby incorporated by reference in its entirety.

BACKGROUND OF THE DISCLOSURE

Field of the Disclosure

The present disclosure generally relates to the field of electric vehicles. More specifically, the disclosure relates to a system and a method of modulating the charging rate of a charging station used to recharge a battery of a vehicle as a function of an expected passenger load.

Description of the Related Art

With the advent of autonomous driving capabilities for vehicles and the shift towards electrification of vehicles, more and more traditional transportation systems are being upgraded or replaced with such newer and often more flexible technologies. Although these latest systems provide new opportunities for users, they also create new challenges for their designers. When designing a whole system using many automated electric vehicles many interrelated parameters must be considered and weighted, such as the optimal size of vehicles, optimal size of the batteries, quantity of vehicles required for a given passenger capacity, cost of recharging infrastructure, recharging and route strategy, etc. Because batteries still represent a considerable portion of the cost of a vehicle, particular attention must be paid to their cost, capacity, performance and life expectancy.

In the electric bus market, a bottle-feeding charging strategy is sometimes used to help reduce quantities of batteries. In one such strategy, buses are slightly recharged at each bus stop. However, to keep the charging rate at a level that is not damaging for the batteries, the bus needs to stay longer at each bus stop, increasing the time required for travelling a predetermined route. It also means that less passengers per hour may be carried, unless more busses are used. Conversely, if the bus schedule is to be respected and no time lost, then the batteries get damaged because they are recharged too rapidly.

Another bottle-feeding strategy consists of using a point catenary recharge on straight line sections without intersection. With this latter solution, busses are recharged over a longer period at a lower charging rate, benefiting a longer battery life. Although this strategy also provides a faster travel time than the previous strategy, the required recharging catenaries are expensive, significantly increasing the cost of a system.

There is therefore a need for an improved recharging strategy for autonomous mass transit vehicles. The present disclosure provides one such battery recharging strategy which is useful in the application of autonomous electric vehicles technology in a closed environment, such as an airport.

SUMMARY OF THE DISCLOSURE

Generally, the present disclosure provides a system and a method of charging a battery of an electric vehicle that overcomes or mitigates one or more disadvantages of known charging systems and methods, or at least provides a useful alternative.

The disclosure provides the advantages of extending the life expectancy of a battery by not charging it at a high charging rate when not necessary.

In some non-limiting embodiments or examples, there is provided a system for carrying passengers within a controlled environment. The system comprises a fleet of autonomous electric vehicles for carrying passengers, a charging station and a controller. Each vehicle of the fleet of autonomous electric vehicles is equipped with a battery. The fleet has at least one vehicle in duty mode and one vehicle in idle mode. The at least one vehicle in duty mode is operative to carry passengers from a first area to a second area of the controlled environment while the at least one vehicle in idle mode is connected to the charging station for recharging its battery. The controller, which is also connected to the charging station, is operative to control a charging rate used by the charging station for charging the battery of the at least one vehicle in idle mode. This charging rate is based on a duration between a time of start of a charging and a forecasted time of start of duty mode of the at least one vehicle in idle mode.

In some non-limiting embodiments or examples, the controller is operative to determine the duration based on a forecasted load of passengers to be carried from the first area to the second area of the controlled environment as a function of time. The forecasted load of passengers may either be determined from historical data, be determined based on an image analysis of passengers circulating in an airport, or be based on information about travelers flying aboard incoming flights. In this latter case, the information about travelers may be selected from the group consisting of: flight number, arriving gate identification, destination, connection flight number, departing gate, quantity of passengers, and quantity of flight crew.

The forecasted time of start of duty mode of the at least one vehicle in idle mode may be a function of a vehicle passenger capacity.

The charging rate may be a function of the forecasted load of passengers. The charging rate may be proportional to the forecasted load of passengers and/or may be proportional to the duration.

In some non-limiting embodiments or examples, there is provided a method for managing a fleet of autonomous electric vehicles for carrying passengers within a controlled environment. The method comprises:

circulating a first subset of the fleet of vehicles for carrying passengers from a first area to a second area of the controlled environment;

accessing data about a load of passengers to be carried from the first area to the second area of the controlled environment, where the load of passengers is a function of time;

determining a forecasted time of start of duty mode of a second subset of the fleet of vehicles based on the load of passengers, the second subset being in idle mode;

determining a duration between a time of start of charging the batteries of the second subset of the fleet of vehicles and the forecasted time of start of duty mode of the second subset of the fleet of vehicles;

determining a charging rate where the charging rate is a function of the duration; and charging the batteries of the second subset of the fleet of vehicles at the determined charging rate using a charging station.

In some non-limiting embodiments or examples, the data on the load of passengers may be either obtained from an historical database, determined based on an image analysis of passengers circulating in an airport or determined based on information of passengers flying aboard incoming flights. In this latter case, the determining the load of passengers may comprise selecting the information from the group consisting of: flight number, arriving gate identification, destination, connection flight number, departing gate, quantity of passengers, and quantity of flight crew.

The forecasted time of start of duty mode of the second subset of the fleet of vehicles may be a function of a vehicle passenger capacity.

The charging of the battery may comprise using a charging rate that is proportional to the load of passengers and/or that is inversely proportional to the duration.

In some non-limiting embodiments or examples, the method may further comprise:
  obtaining expected passenger correspondence information;
  creating a vehicle route based on the passenger correspondence information;
  charging the second subset by further modulating the charging rate based on the created vehicle route.

Moreover, the circulating may further comprise adjusting a quantity of vehicles within the first subset based on the load of passengers.

A controller may be used both to access data on the load of passengers and for determining the charging rate.

In some non-limiting embodiments or examples, the vehicles circulate autonomously, that is without a driver.

In some non-limiting embodiments or examples, there is provided a system for controlling the charging of a battery of an autonomous electric vehicle. The system comprises a charging station capable of charging the battery at a variable charging rate and a controller connected to the charging station. The controller is operative to determine and modulate, or adjust, the charging rate based on a duration between a time of start of charging the vehicle and a forecasted time of start of duty mode of the vehicle. The duration is determined by the controller based on a forecasted passenger load as a function of time. When the controller determines that the forecasted passenger load justifies that the vehicle starts operating, this defines the time of the start of duty mode of the vehicle. The difference between that future event and the moment when the vehicle may start being charged is equal to the duration.

The controller is operative to increase the charging rate when the forecasted passenger load increases. It is also operative to adjust the charging rate inversely proportional to the duration.

A database containing historical data on the forecasted passenger load may be part of the system and may be accessed by the controller. Alternatively, the system may use an image analysis system connected to both a camera system and to the controller to determine the forecasted passenger load based on an image analysis of passengers circulating in an airport. In another option, the controller may be operatively connected to receive information about travelers flying aboard incoming flights and to determine the forecasted passenger load based on this information.

In some non-limiting embodiments or examples, there is provided a method for managing a charging station for charging a battery of a connected autonomous electric vehicle used for carrying passengers in a controlled environment. The method comprises:
  accessing information about a passenger load as a function of time;
  determining a forecasted time of start of duty mode based on the passenger load;
  determining a duration between a time of start of charging the battery and the forecasted time of start of duty mode of the connected autonomous electric vehicle;
  determining a charging rate which is a function of the duration; and
  charging the battery of the connected autonomous electric vehicle at the determined charging rate.

The passenger load may be based on historical data. Alternatively, the passenger load may be determined based on an image analysis of passengers circulating in an airport, or it may be determined based on passenger information of passengers flying aboard incoming flights. In this latter case, determining the passenger load may comprise selecting the passenger information from the group consisting of: flight number, arriving gate identification, destination, connection flight number, departing gate, quantity of passengers, and quantity of flight crew.

The time of the start of duty mode of the connected autonomous electric vehicle is a function of a vehicle passenger capacity. The step of charging the battery may comprise using a charging rate that is proportional to the passenger load and/or that is inversely proportional to the duration.

In further non-limiting embodiments or aspects, the disclosure may be further characterized by one or more of the following clauses:

Clause 1: A method for managing a charging station for charging a battery of a connected autonomous electric vehicle for carrying passengers in a controlled environment, the method comprising: accessing information about a passenger load as a function of time; determining a forecasted time of start of duty mode based on the passenger load; determining a duration between a time of start of charging the battery and the forecasted time of start of duty mode of the connected autonomous electric vehicle; determining a charging rate, the charging rate being a function of the duration; and charging the battery of the connected autonomous electric vehicle at the determined charging rate.

Clause 2: The method of clause 1, wherein the passenger load is based on historical data.

Clause 3: The method of clause 1 or 2, further comprising determining the passenger load based on an image analysis of passengers circulating in an airport.

Clause 4: The method of any of clauses 1-3, further comprising determining the passenger load based on passenger information of passengers flying aboard incoming flights.

Clause 5: The method of clause 4, wherein the determining the passenger load comprises selecting the passenger information from the group consisting of: flight number, arriving gate identification, destination, connection flight number, departing gate, quantity of passengers, and quantity of flight crew.

Clause 6: The method of any of clauses 1-5, wherein the time of start of duty mode of the connected autonomous electric vehicle is a function of a vehicle passenger capacity.

Clause 7: The method of any of clauses 1-6, wherein the charging the battery comprises using a charging rate that is proportional to the passenger load.

Clause 8: The method of any of clauses 1-7, wherein the charging the battery comprises using a charging rate that is inversely proportional to the duration.

Clause 9: A method for managing a fleet of autonomous battery electric vehicles for carrying passengers, the autonomous battery electric vehicles operating within a controlled environment, the method comprising: circulating in duty mode a first subset of the fleet of vehicles for carrying passengers from a first area to a second area of the controlled environment; accessing data about a load of passengers to be carried from the first area to the second area of the controlled environment, the load of passengers being a function of time; determining a forecasted time of start of duty mode of a second subset of the fleet of vehicles based on the load of passengers, the second subset being in idle mode; determining a duration between a time of start of a charging the batteries of the second subset of the fleet of vehicles and the forecasted time of start of duty mode of the second subset of the fleet of vehicles; determining a charging rate, the charging rate being a function of the duration; and charging the batteries of the second subset of the fleet of vehicles at the determined charging rate using a charging station.

Clause 10: The method of clause 9, wherein the data on the load of passengers is obtained from an historical database.

Clause 11: The method of clause 9 or 10, further comprising determining the load of passengers based on an image analysis of passengers circulating in an airport.

Clause 12: The method of any of clauses 9-11, further comprising determining the load of passengers based on information of passengers flying aboard incoming flights.

Clause 13: The method of clause 12, wherein the determining the load of passengers comprises selecting the information from the group consisting of: flight number, arriving gate identification, destination, connection flight number, departing gate, quantity of passengers, and quantity of flight crew.

Clause 14: The method of any of clauses 9-13, wherein the forecasted time of start of duty mode of the second subset of the fleet of vehicles is a function of a vehicle passenger capacity.

Clause 15: The method of any of clauses 9-14, wherein the charging the battery comprises using a charging rate that is proportional to the load of passengers.

Clause 16: The method of any of clauses 9-15, wherein the charging the battery comprises using a charging rate that is inversely proportional to the duration.

Clause 17: The method of any of clauses 9-16, further comprising: obtaining expected passenger correspondence information; creating a vehicle route based on the passenger correspondence information; charging the second subset by further modulating the charging rate based on the created vehicle route Clause 18: The method of any of clauses 9-17, wherein the circulating further comprises adjusting a quantity of vehicles within the first subset based on the load of passengers.

Clause 19: The method of any of clauses 9-18, further comprising using a controller to access data on the load of passengers and for determining the charging rate.

Clause 20: A system for controlling the charging of a battery of an autonomous electric vehicle, the system comprising: a charging station adapted to charge the battery at a variable charging rate; and a controller, the controller being connected to the charging station, the controller being operative to determine and modulate the charging rate based on a duration between a time of start of charging the vehicle and a forecasted time of start of duty mode of the vehicle, the duration being determined by the controller based on a forecasted passenger load as a function of time.

Clause 21: The system of clause 20, wherein the controller is operative to increase the charging rate when the forecasted passenger load increases.

Clause 22: The system of clause 20 or 21, wherein the controller is operative to modulate the charging rate inversely proportionally to the duration.

Clause 23: The system of any of clauses 20-22, further comprising a database containing historical data on the forecasted passenger load.

Clause 24: The system of any of clauses 20-23, further comprising an image analysis system, the image analysis system being connected to the controller and to a camera system, the image analysis system being operative to determine the forecasted passenger load based on an image analysis of passengers circulating in an airport.

Clause 25: The system of any of clauses 20-24, wherein the controller is operatively connected to receive information about travelers flying aboard incoming flights and to determine the forecasted passenger load based on the information.

Clause 26: A system for carrying passengers within a controlled environment, the system comprising: a fleet of autonomous electric vehicles for carrying passengers, each vehicle of the fleet of autonomous electric vehicles having a battery, the fleet having: at least one vehicle in duty mode, the at least one vehicle in duty mode being operative to carry passengers from a first area to a second area of the controlled environment; at least one vehicle in idle mode; a charging station, the at least one vehicle in idle mode being connected to the charging station for recharging its battery; and a controller connected to the charging station, wherein the controller is operative to modulate a charging rate used by the charging station for charging the battery of the at least one vehicle in idle mode, the charging rate being based on a duration between a time of start of a charging and a forecasted time of start of duty mode of the at least one vehicle in idle mode.

Clause 27: The system of clause 26, wherein the charging rate is inversely proportional to the duration.

Clause 28: The system of clause 26 or 27, wherein the controller is operative to determine the duration based on a forecasted load of passengers to be carried from the first area to the second area of the controlled environment as a function of time.

Clause 29: The system of clause 28, wherein the forecasted load of passengers is determined from historical data.

Clause 30: The system of clause 28 or 29, wherein the load of passengers is determined based on an image analysis of passengers circulating in an airport.

Clause 31: The system of any of clauses 28-30, wherein the load of passengers is based on information about travelers flying aboard incoming flights.

Clause 32: The system of clause 31, wherein the information about travelers is selected from the group consisting of: flight number, arriving gate identification, destination, connection flight number, departing gate, quantity of passengers, and quantity of flight crew.

Clause 33: The system of any of clauses 28-32, wherein the forecasted time of start of duty mode of the at least one vehicle in idle mode is a function of a vehicle passenger capacity.

Clause 34: The system of any of clauses 28-33, wherein the charging rate is proportional to the forecasted load of passengers.

BRIEF DESCRIPTION OF DRAWINGS

These and other features of the present disclosure will become more apparent from the following description in which reference is made to the appended drawings wherein:

FIG. 9b is a graph of vehicles in duty mode as a function of time of day adapted to service the forecasted passenger load of FIG. 9a;

FIG. 10 is a timetable of a fleet of vehicles operating in the airport environment of FIG. 1 to service the forecasted passenger load of FIG. 9a;

FIG. 11b is a graph of vehicles in duty mode as a function of time of day adapted to service the forecasted passenger load of FIG. 11a; and FIG. 12 is a timetable of a fleet of vehicles operating in the airport environment of FIG. 1 to service the forecasted passenger load of FIG. 11a.

Various non-limiting examples will now be described with reference to the accompanying figures where like reference numbers correspond to like or functionally equivalent elements.

DETAILED DESCRIPTION OF THE DISCLOSURE

The present disclosure allows charging the battery of an idle vehicle at a charging rate that will not unduly strain battery cells, inasmuch as a duration before the vehicle starts a duty mode will allow.

Figure 1:
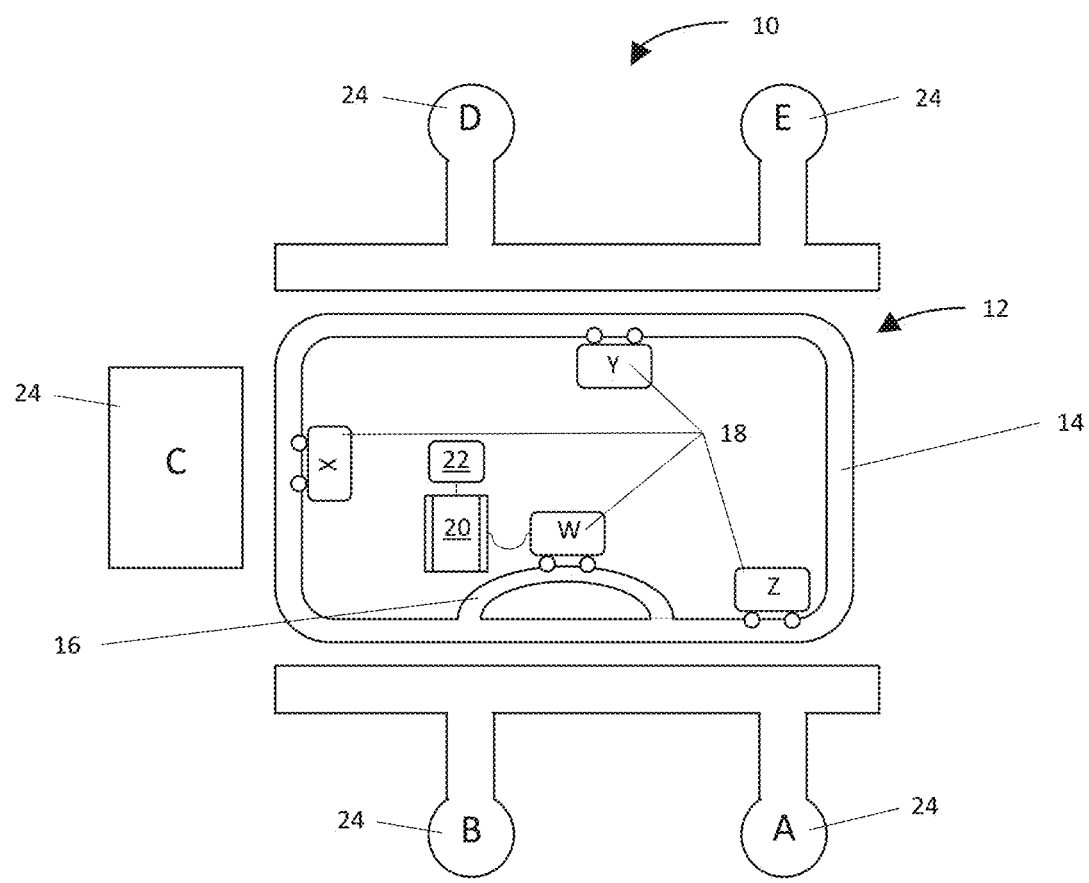
FIG. 1 is a top view of an airport environment using an automated people mover system according to the principles of the present disclosure.

FIG. 1 is now referred to. An automated people mover system 10 designed to carry passengers within a closed, controlled or restricted environment 12 is depicted. The closed or controlled environment 12 is an environment where access is restricted to those vehicles or people who have authorization to circulate there. In the present case, an airport, with its terminals A, B, C, D and E, is used as an example of the controlled environment 12. Other types of controlled environments could be, for example, a military compound, an industrial plant, a gated private route or area, etc. The controlled environment 12 typically comprises routes and/or an open area where vehicles may circulate. In the present example, the controlled environment 12 comprises a route 14 and a connected diverting route 16. The automated people mover (APM) system 10, comprises a fleet of autonomous electric vehicles 18 for carrying passengers, a charging station 20 and a controller 22. The route 14 is the road where vehicles 18 circulate when in duty mode to pick up and disembark people at terminals. The diverting route 16 is where vehicles 18 are off duty mode, or in idle mode and where they are either parked or they recharge their batteries.

Figure 2:
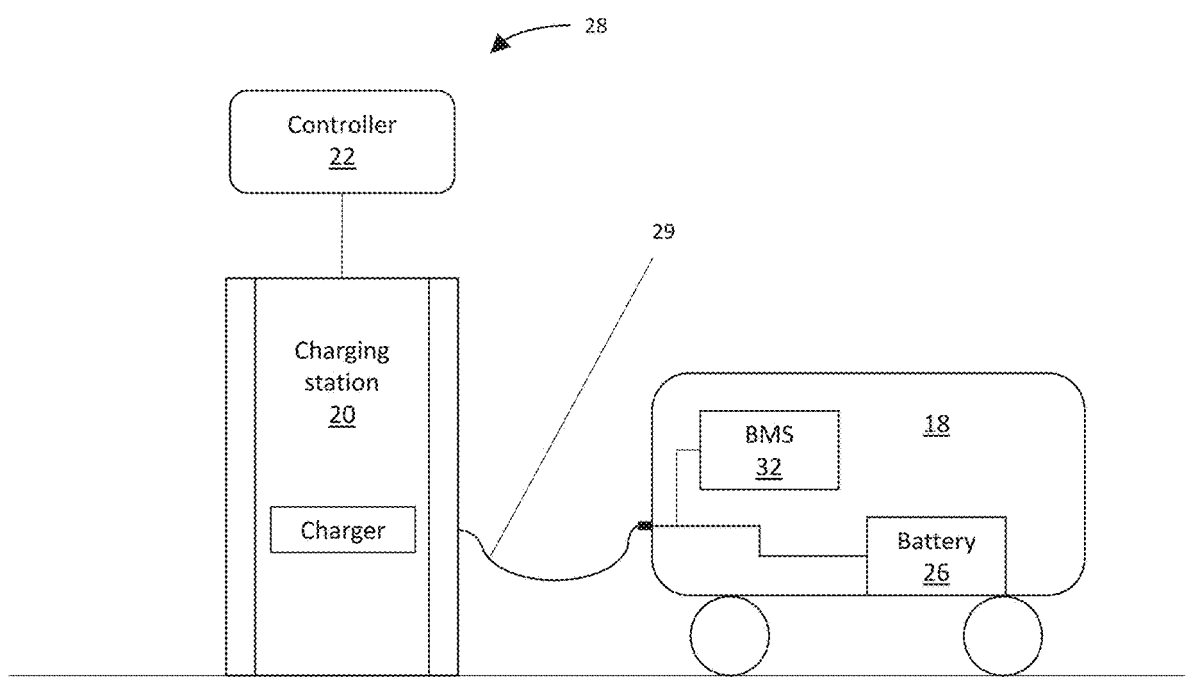
FIG. 2 is a schematic view of a vehicle in idle mode in the process of being recharged according to the principles of the present disclosure.

The fleet of autonomous electric vehicles 18 comprises at least two vehicles 18. In the present non-limiting example, the fleet comprises four vehicles 18 labelled W, X, Y and Z. At least one vehicle 18 is in duty mode, and at least one vehicle 18 is in idle mode. In FIG. 1, three vehicles 18 in duty mode (X, Y, Z) are operative to carry passengers from a first area 24 to a second area 24 of the controlled environment 12 while one vehicle 18 in idle mode (W) is connected to the charging station 20 for recharging its battery 26. The battery 26 is best shown in FIG. 2, now concurrently referred to. In the present example, the areas 24 are represented by five terminals A, B, C, D and E. The three vehicles 18 in duty mode (X, Y, Z) operate autonomously to carry passengers from one terminal to another. The vehicles 18 may circulate all in the same direction along route 14, going from one terminal to another in sequence (in example, from A to B to C to D to E and then back to A), or in any other order dependent on requirements. The vehicles 18 in duty mode do not necessarily have to stop at all terminals along their route, nor does their route always need to remain the same. Advantageously, the routes of the autonomous vehicles 18 in duty mode may be predetermined or adapted, depending on circumstances. For example, the routes may be redefined and adjusted according to the load of passengers waiting to be carried by the vehicles 18, and/or the destinations of these passengers, or any other requirement.

Figure 3A:
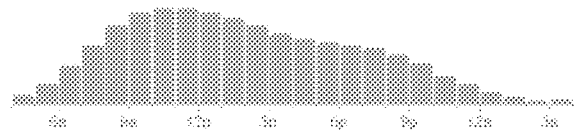
FIG. 3a is a graph of people traffic as a function of time of day at the Paris-Charles-de-Gaulle airport on a Tuesday according to the principles of the present disclosure.
Figure 3C:
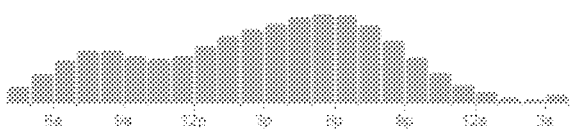
FIG. 3c is a graph of people traffic as a function of time of day at the Trudeau airport of Montreal on a Tuesday according to the principles of the present disclosure.
Figure 3B:
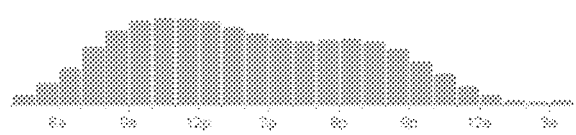
FIG. 3b is a graph of people traffic as a function of time of day at the Paris-Charles-de-Gaulle airport on a Sunday according to the principles of the present disclosure.
Figure 3D:
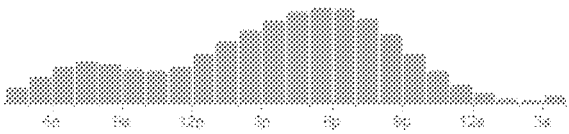
FIG. 3d is a graph of people traffic as a function of time of day at the Trudeau airport of Montreal on a Sunday according to the principles of the present disclosure.

Because the autonomous electric vehicles 18 in duty mode may be controlled or preprogrammed independently, their use may be tailored to the load of passengers to be carried from one area 24 of the controlled environment 12 to another area 24. This load of passengers to be carried may be a function of time: it may depend on the time of day, on the day of a week, or on the week of a month for example. In the present example where the controlled environment 12 is an airport, the load of passengers to be carried from one terminal to another varies not only as a function of the time of day, but also as a function of the day of the week or of a particular time of the year (for example, Christmas holidays, Thanksgiving weekend or Spring break week). An example of this is depicted in FIGS. 3a to 3d, now concurrently referred to, where the daily passengers traffic travelling through two different airports, Paris Charles-de-Gaulle and Montreal Trudeau on two different days are depicted. In the graphs, passenger traffic is shown as a function of the time of day. For each airport, two graphs are shown, one for Thursday (FIGS. 3a and 3c) and one for Sunday (FIGS. 3b and 3d). As can be observed, not only does passenger traffic vary as a function of the day, ramping up in the morning and tapering down late at night, but it also varies depending on the day of the week. It can also be observed that both airports have different graph profiles, not only demonstrating that the total number of travelers is different, but also that the busiest hours are not the same.

Travelers traffic within the airport, moving from one terminal to another may not only be proportional to the time of day, it may also be related to the nature of the activities at the terminal, the airlines present at the terminal, etc.

Data on passenger load present at a terminal and waiting to be carried from this terminal to another may be documented based on historical information. Alternatively, or additionally, this traffic data on passenger load may also be determined based on information of passengers flying aboard incoming flights. In this latter case, the expected or forecasted load of passengers may be determined by analyzing the passenger information on the flight expected to arrive, identification of the arriving gate, the final destination of the travelers and/or their connecting flight number, their departing gate, the quantity of passengers, the quantity of flight crew, etc. All this information may serve to determine the forecasted load of passengers at each terminal as a function of the time of the day. Hence, graphs similar to those depicted in FIG. 3, or tables or databases containing such information may be constructed for each terminal. Alternatively, passenger load may also be determined based on an image analysis of passengers circulating in the airport.

FIG. 2 depicts a charging system 28 in the process of recharging a battery 26 of the at least one vehicle 18 in idle mode according to the present example. Advantageously, the use of autonomous vehicles 18 allows the flexibility of using only the required number of vehicles in duty mode. This allows to decrease the quantity of energy used by the whole fleet of vehicles 18 and to decrease required maintenance on vehicles as they are globally used less than in a fixed driverless automated people mover system. So, when not required in duty mode, a second subset of the fleet of vehicles 18 may be in idle mode. At least one of these vehicles 18, depicted in FIG. 2, uses this opportunity to replenish its battery 26. The vehicle 18 in idle mode is therefore connected to the charging station 20, which is itself connected to a controller 22 which manages the one, or more, charging station 20. The vehicle 18 in idle mode may be connected to the charging station 20 either by an electric cable 29 such as depicted in FIG. 2, by a catenary, or wirelessly by using an inductive charging technology. If more than one vehicle 18 are in idle mode and if only one charging station 20 is present, the controller 22 may decide to which vehicle 18 in idle mode priority is given in order to recharge its battery 26. It is also possible that all vehicles 18 in idle mode be recharged at once, if a sufficient quantity of recharging stations 20 is provided. Also, it is possible that instead of having one or more charging stations 20 located at a dedicated area outside the main circulating route 14 (i.e. on the diverting route 16, as shown in FIG. 1), a plurality of charging stations 20 be rather located along the circulating route 14, preferably where the vehicles 18 must stop such as at the terminals. The vehicles 18 are then briefly charged. Another alternative may be to recharge vehicles 18 along the circulating route 14 with overhead catenaries. The charging strategy, as detailed below, may remain the same whether the charging stations 20 are located in a dedicated area on the diverging route 16 or whether they are spread along the circulating route 14. The drawback of using catenaries however is the increased cost and visual pollution. The most compatible way of recharging with the present method is in a dedicated area.

The controller 22, connected to the charging station 20, is operative to control a charging rate used by the charging station 20 for charging the respective battery 26 of the at least one vehicle 18 in idle mode. This charging rate is determined by the controller 22 based on a duration which is a difference between a time of start of a charging of the vehicle 18 in idle mode and a forecasted time of start of duty mode for that same vehicle 18. The forecasted time of start of duty mode is based on the passenger load data and on the passenger capacities of the vehicles 18 in duty mode and in idle mode (which are not necessarily the same). The moment the vehicles 18 in duty mode reach their maximum capacity is the moment the at least one vehicle in idle mode needs to start its duty mode. In other words, the forecasted time of start of duty mode is the moment a vehicle 18 needs to leave its idle mode to join the subset of the fleet of vehicles 18 already operating in duty mode, based on passenger load data. The time of start of charging may be basically as soon as the charging station 20 is ready to charge the battery 26 of a respective one connected vehicle 18 in idle mode. Alternatively, the controller 22 may decide not to start charging right away so the time of start of charging may also be a future event.

The maximum passenger capacity of the at least one vehicle 18 in duty mode may be adjusted for regional preferences, time of year (for example, maximum passenger capacity may be reduced in winter because passenger wear more voluminous clothes), etc. Also, it may be desirable not to reach 100% of the vehicle's theoretical capacity, to provide a more comfortable ride to passengers. Whatever the reason, the maximum capacity of the vehicles 18 in duty mode is a factor considered by the controller 22 when it determines, based on the passenger load as a function of time, the time of start of duty mode for the vehicle 18 in idle mode.

Once the controller 22 has determined the duration, the controller 22 determines the charging rate for recharging one connected autonomous electric vehicle 18 in idle mode. Knowing that high charging rates may be detrimental to a battery life, the controller 22 tries to use a charging rate that is as low as possible, while not being too low so as to prevent having sufficient time to recharge other vehicles in idle mode as required. For each vehicle 18 in idle mode needing to be recharged, the controller 22 then independently selects the specified lowest charging rate that will both allow maintaining the life of the respective batteries 26 of the vehicles 18 in idle mode while still ensuring maintaining adequate capacity of the vehicles in duty mode. The controller 22 will give priority to maintaining adequate capacity of the subset of vehicle 18 in duty mode. Hence, if ever the duration is not sufficient to recharge one or more vehicles 18 in idle mode, then the controller 22 will select a higher charging rate which may not be optimum to preserve battery life, but that will ensure sufficient capacity of the subset of vehicles 18 in duty mode. The controller 22 is operative to modulate the charging rate inversely proportional to the duration.

As an example, a low charging rate may be comprised between 50 and 100 kW and a high charging rate may be comprised between 100 kW and 400 kW, or even higher than 400 kW.

The controller 22 may adjust the charging rate at which the charging station 20 is recharging a battery 26 by increasing or decreasing it if the forecasted passenger load changes, most often unexpectedly. For example, the controller 22 could increase the charging rate at which the charging station 20 is recharging a battery 26 if the forecasted passenger load increases. The controller 22 nevertheless always communicates with a battery management system (BMS) 32 to ensure that the determined charging rate never exceeds what the BMS will allow. The BMS 32 may share information with the controller 22 about battery capacity, state of charge, preferred charging rate and accumulated degradation amongst others.

Figure 4:
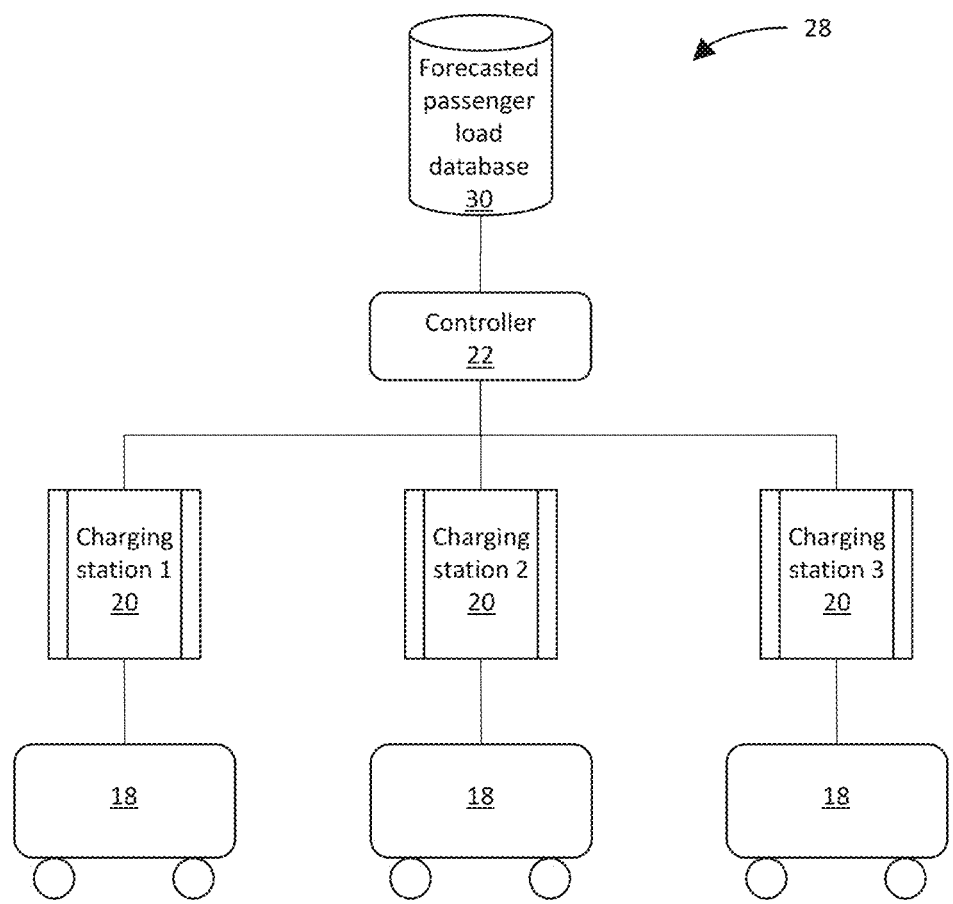
FIG. 4 is a schematic view of three vehicles in idle mode in the process of being recharged according with the principles of the present disclosure.

FIG. 4 is now concurrently referred to. In another non-limiting example, the charging system 28 comprises more than one charging station 20. In the present example, the charging system 28 comprises three charging stations 20 charging three vehicles 18 in idle mode. The controller 22 controls the charging rates of all three vehicles 18. A database 30, containing historical data on the forecasted passenger load, is part of the charging system 28. The controller 22 is connected to this database 30 and has access to the stored passenger load data. The controller 22 manages the charging of the vehicles 18 in idle mode based on this passenger load data.

Figure 5:
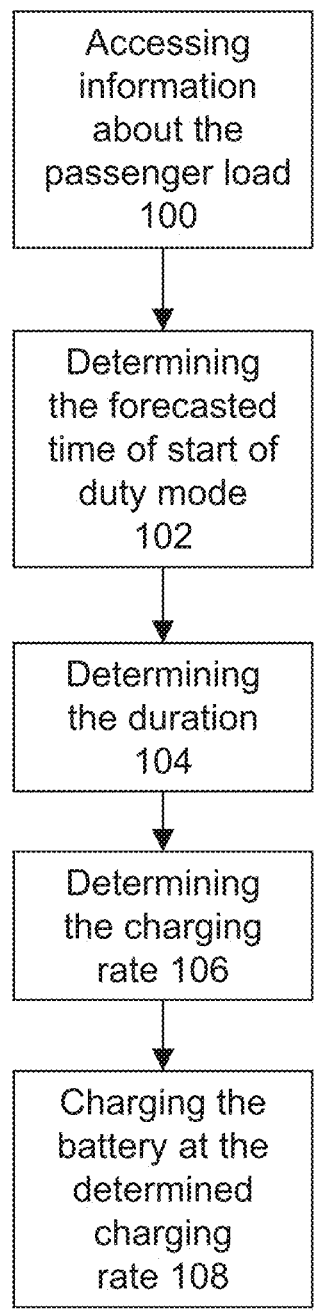
FIG. 5 is a schematic of a process for recharging according with the principles of the present disclosure.

FIG. 5, now concurrently referred to, shows the steps of a method for managing one or more charging stations 20 that charge the batteries 26 of connected autonomous electric vehicles 18 in idle mode. The method comprises the steps of:
- accessing information 100 about the passenger load as a function of time;
- determining the forecasted time of start of duty mode 102 based on the passenger load;
- determining the duration 104 between the start of charging the batteries 26 and the forecasted time of the start of duty mode of the at least one connected autonomous electric vehicle 18 in idle mode;
- determining the charging rate 106 for each battery 26 of the at least one vehicle in idle mode, each charging rate being a function of the duration. The charging rate may be different for each battery 26 of each vehicle 18 in idle mode; and
- charging 108 the battery of the at least one connected autonomous electric vehicle 18 in idle mode at the determined charging rate specific for each battery 26.

Figure 6:
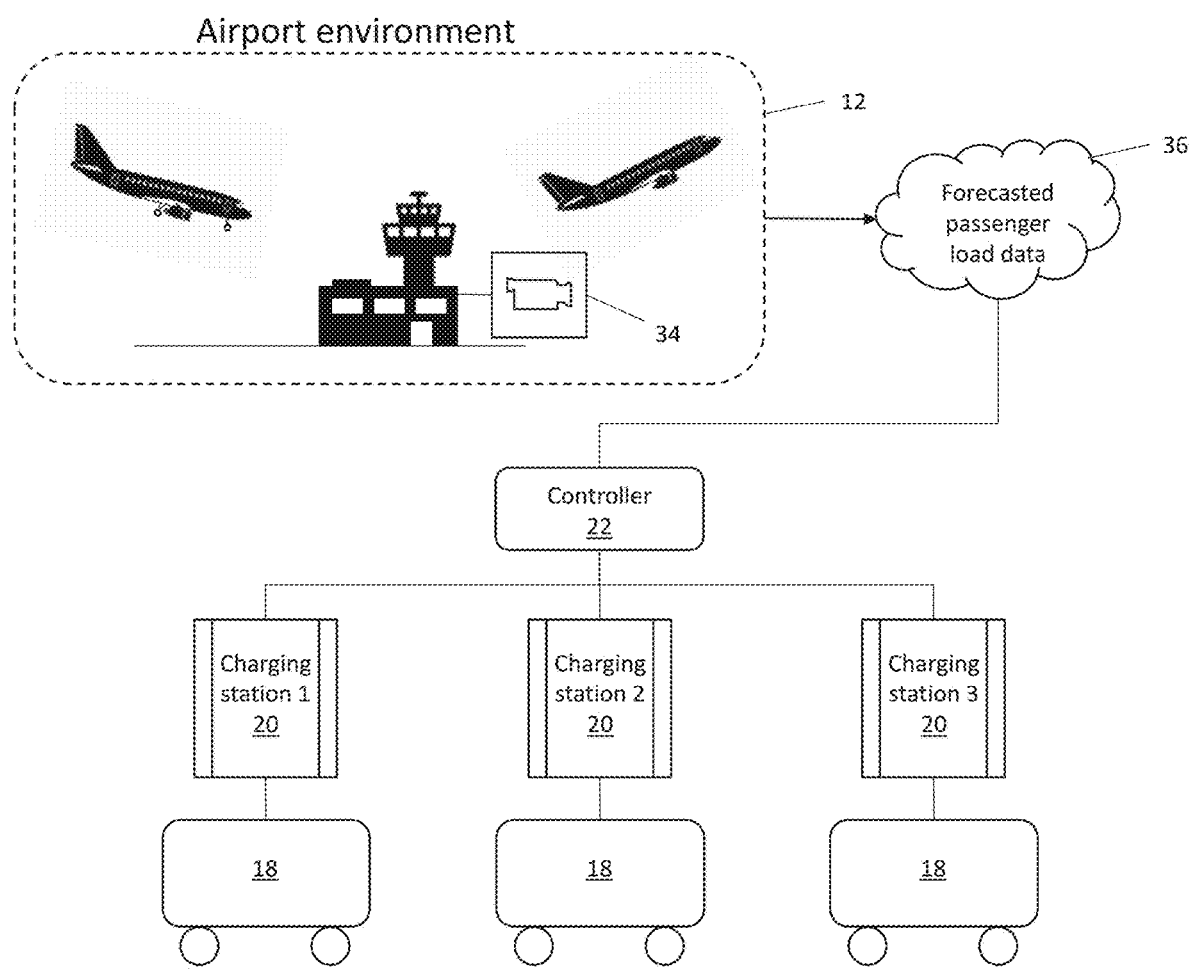
FIG. 6 is a schematic view of three vehicles in idle mode in the process of being recharged according with the principles of the present disclosure.
Figure 7:
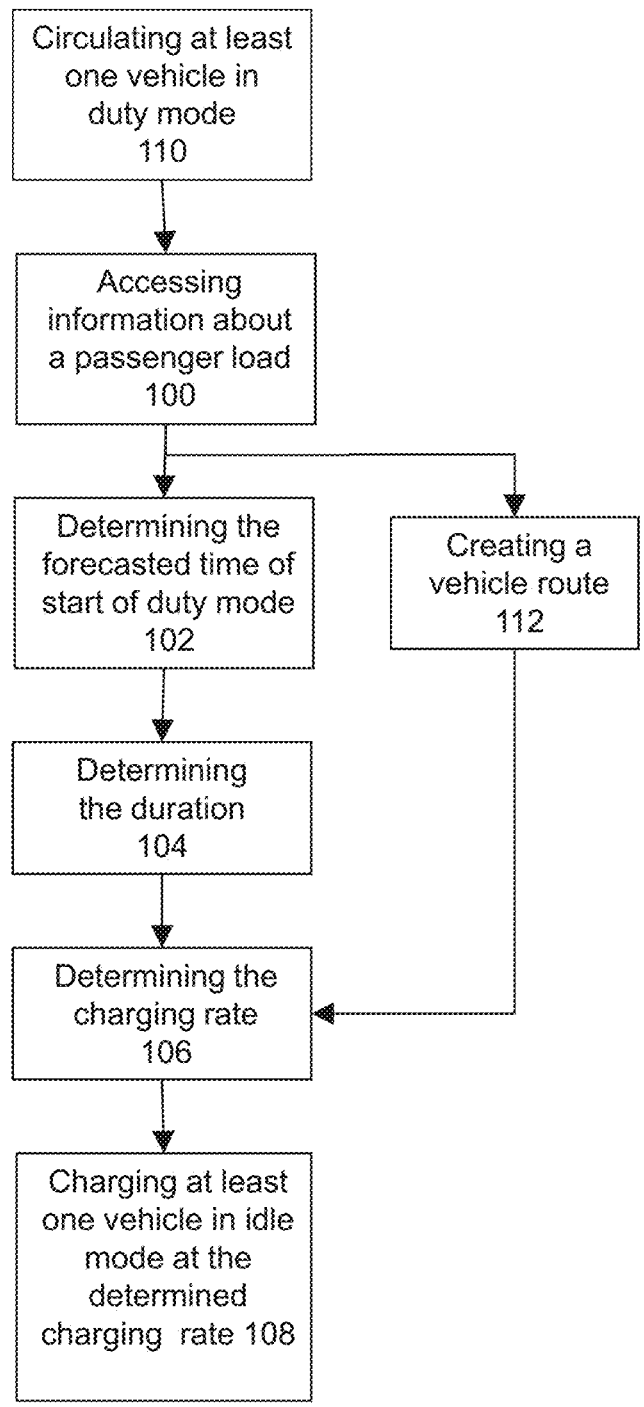
FIG. 7 is a schematic of a process for managing a fleet of vehicles within the airport environment of FIG. 1 according with the principles of the present disclosure.

FIGS. 6 and 7 are now concurrently referred to. In another preferred and non-limiting embodiment or example, there is provided a method for managing the fleet of autonomous electric vehicles 18 used to carry passengers from one area of the controlled environment to another area. The method comprises the following steps:
- circulating 110 the first subset of the fleet of vehicles 18 (that is at least one vehicle 18 in duty mode) within the confines of the controlled environment 12 in order to carry passengers from the first area 24 (i.e one terminal of the airport) to at least one other area (i.e. at least one other terminal of the airport) of the controlled environment 12;
- accessing information 100 about the load of passengers to be carried from the between the first area 24 to the at least one other area 24 of the controlled environment 12, where the load of passengers is a function of time;
- determining a forecasted time of start of duty mode 102 of the second subset of the fleet of vehicles 18 (that is at least one vehicle 18 in idle mode) based on the load of passengers;
- determining the duration 104 between the time of the start of charging the second subset of the fleet of vehicles 18 (i.e. the time of the start of charging the at least one vehicle in idle mode) and the forecasted start of operating in duty mode of the second subset of the fleet of vehicles;
- determining a charging rate 106 where the charging rate is a function of the duration; and
- charging 108 the second subset of the fleet of vehicles at the determined charging rate using a charging station.

As described above, the passenger information may be enclosed in a database to which the controller 22 has access. However, the passenger information may also be determined by analyzing images taken from a camera system 34 installed in strategic areas of the controlled environment 12. For example, the cameras of the camera system 34 could be installed at each terminal nearby a door where passengers must exit to embark aboard one of the vehicles 18 in duty mode. Each camera relays the information to the camera system 34, which in turn relays the information to an image treatment system capable of determining the number of persons or passengers awaiting to board the next circulating vehicle 18 at a given area 24 (i.e. terminal). As described previously, another option is to access information about passengers aboard incoming flights and to forecast their whereabouts within the controlled environment 12 based on such information. For example, knowing that passenger John Doe presently aboard flight AC123 is forecasted to arrive at 10:12 am at terminal A with a connection to flight US456, departing from terminal D at 11:46 am, it is possible to forecast with certain probabilities that this passenger will want to board one of the autonomous vehicles 18 in duty mode shortly after the plane arrived at terminal A to reach terminal D for his next flight. This information may be updated regularly for all passengers arriving and leaving the airport. This information is made available to the controller 22, for example by a central computer or is stored in a cloud 36, allowing access through Internet. The controller 22 then obtains the information for determining the duration until the at least one vehicle 18 in idle mode needs to start operating in duty mode and circulate from one area 24, or terminal, to another area 24.

Another method of determining a passenger load is by using load cells on the vehicles 18. These load cells may read the load (weight) in the vehicle and determine a percentage of occupancy based on a predetermined weight corresponding to a maximum number of passengers. This information may be related directly to the controller 22 or may be sent to a central computer or cloud 36 to which the controller 22 has access. Alternatively, the passenger load could also be determined using a camera in the vehicles 18 and an adequate software.

Optionally, different methods of determining the passenger load may be combined to provide an even more flexible system. For example, historical data may be obtained by the controller 22 and updated information from the camera system 34 may also be obtained. The controller 22 then plans the circulating of the vehicles 18 in duty mode and the recharging of the vehicles 18 in idle mode, but may still react and adapt according to a change in the forecasted passenger load. For example, a snowstorm could hit the airport and incoming flights are re-routed to a different airport, decreasing the forecasted load of passengers until the situation returns to normal. On the other hand, the same snowstorm could negatively influence the speed at which the vehicles 18 may circulate, thereby possibly requiring additional vehicles 18 in duty mode.

Optionally, the method may further comprise:
- creating a vehicle route 112 based on the passenger correspondence information;
- determining the charging rate 106 based, at least in part, on the created vehicle route; and
- charging 108 the second subset with the determined charging rate.

Again, the forecasted time of start of duty mode may be a function of the passenger capacity of the vehicle 18 being recharged during idle mode.

The circulating 110 may further comprise adjusting the quantity of vehicles 18 within the first subset (the vehicles 18 circulating in duty mode) based on the load of passengers. For example, if the load of passengers is detected to increase more than was initially forecasted (for example, the camera system 34 detects more passengers than was forecasted based on historical data), the controller 22 could decide to send a recharged vehicle 18 currently in idle mode into duty mode.

Figure 8:
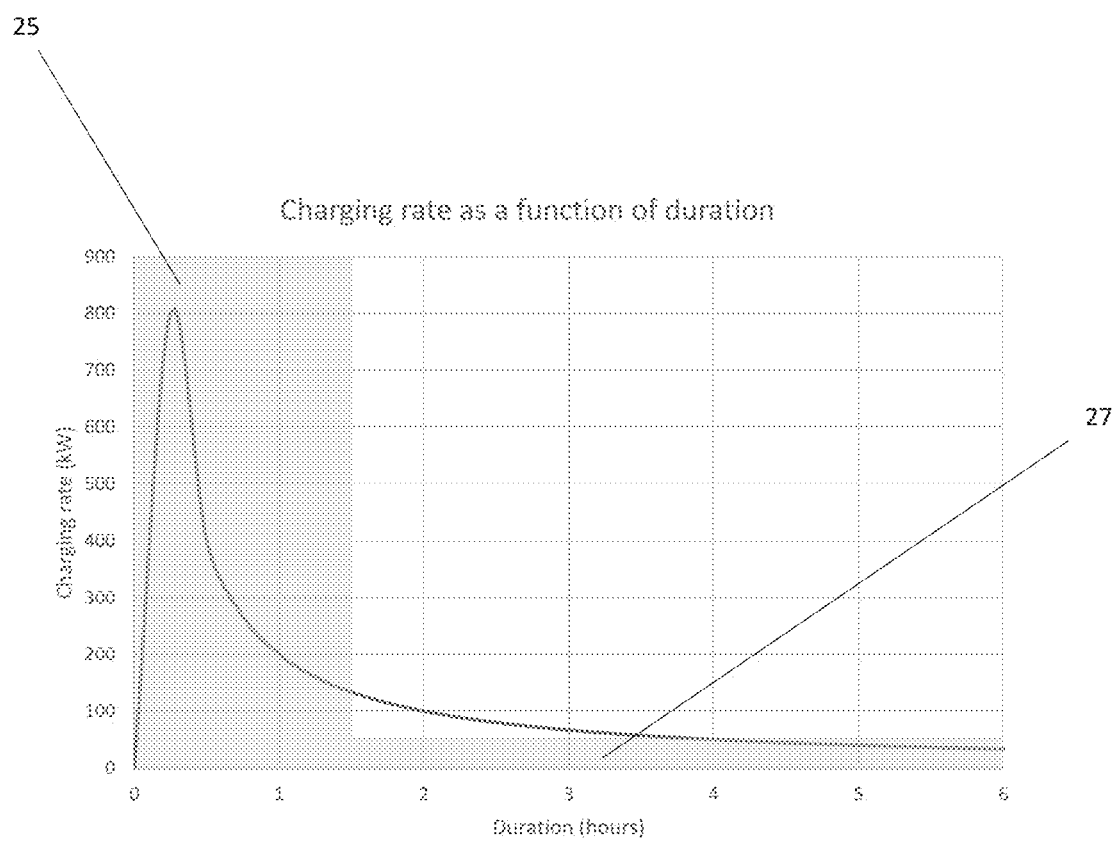
FIG. 8 is a graph of a charging rate as a function of duration.

Another non-limiting example of the present disclosure will now be provided. FIG. 8, now concurrently referred to, depicts an example of the charging rate as a function of duration, in the present case for a battery of 200 kWh. As can be seen, the shorter the duration, the higher the charging rate may be. The charging rate may indeed be calculated as the battery capacity divided by the charging time (which may be equal to the duration in the present case). Because higher charging rates may induce stress in the battery cells, often due to heating, which lead to shortened battery life, charging within a detrimental zone 25 shall be avoided as much as possible. In the present example, the detrimental zone 25 is determined by charging rates higher than 100 kW. However, the exact detrimental zone 25 is particular to each battery specifications and shall be adapted in each case. The controller 22 therefore tries to avoid charging in the detrimental zone 25 unless absolutely necessary. In the present case, a duration shorter than 2 hours will cause the controller 22 to have to charge at a rate inside the detrimental zone 25. Alternatively, the controller 22 could decide to charge at a charging rate outside the detrimental zone at the expense of having the vehicle 18 being not completely recharged when it enters duty mode. On the other hand, there is no benefit to charging at two small a charging rate either. For example, charging at a rate lower than 50 kW can be avoided as it simply takes too much time for the vehicle to be recharged without benefit on the battery life. Such rates lower than 50 kW should therefore be avoided as well. The charging rates lower than 50 kW are highlighted by the low rate zone 27. Consequently, as there is no benefit to charging at such lower rates, the controller 22 charges at a minimum of 50 kW for a maximum of 4 hours.

Figure 9A:
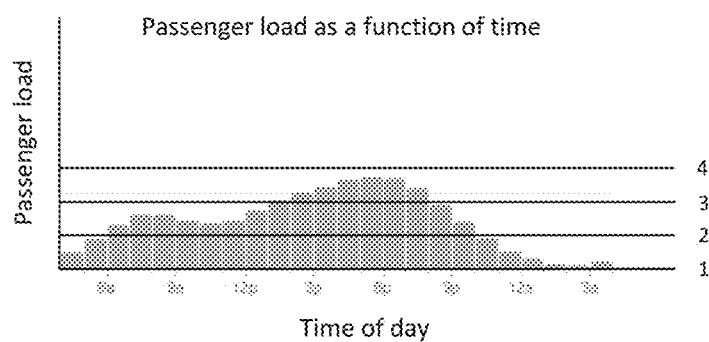
FIG. 9a is a graph of a forecasted passenger load as a function of time of day according to the principles of the present disclosure.
Figure 9B:
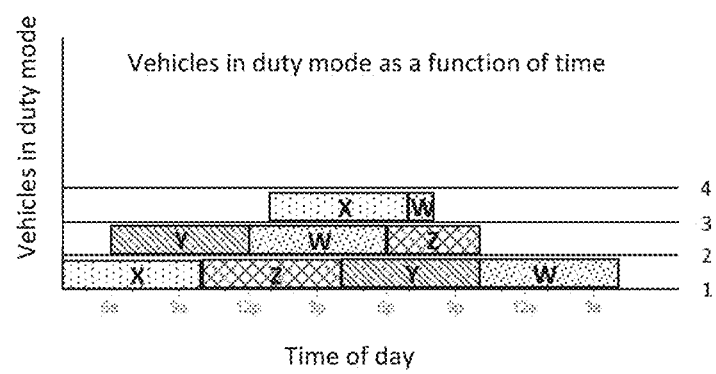

FIGS. 9a and 9b, now concurrently referred to, will be used to illustrate a non-limiting example of the present disclosure. FIG. 9a shows a graph of the forecasted passenger load as a function of time, based on historical data and FIG. 9b shows a graph of the required quantity of vehicles 18 in duty mode as a function of the passenger load shown in FIG. 9a. The horizontal lines show how many vehicles 18 are required to operate in duty mode based on the passenger load as a function of the time of day. From 4 am to 6 am, it can be seen that only one vehicle 18 is sufficient to carry passengers. From 6 am to 1 pm, two vehicles 18 are required in duty mode. From 1 pm to 8 pm, three vehicles 18 are required in duty mode. Then, from 8 pm to 10 pm, the number of travelers decreases such that two vehicles 18 in duty mode are sufficient. And finally, from 10 pm to 4 am, only one vehicle 18 is required to carry passengers. Based on this data, the controller 22 may plan ahead and recharge the vehicles 18 as required. FIG. 9b shows such planning of the hours of operation of the vehicles 18. As can be seen, there is a total of 4 vehicles 18 required to fully carry the passengers during the day from one terminal to another. It is assumed in the present example that one vehicle 18 may circulate during hours before requiring a recharge and that each vehicle 18 is equipped with a battery of 200 kWh. It is assumed that only one charging station 20 is available. In the present example, no difference is made from which terminal to which terminal the passengers are travelling. As before, the vehicles are labelled W, X, Y and Z.

FIG. 10, which is now concurrently referred to, is a timetable showing the operation times (the time in duty mode), the time in idle mode as well as the charging schedule and charging rates for each vehicles W, X, Y and Z. In this table, the duration is represented by the length of the charging times. For example, when the charging time of vehicle W extends from 4:00 to 7:00, the charging time is 3 hours. As can be observed, the controller 22 tries to charge the vehicles 18 at a lower charging rate whenever possible. Most of the times, the vehicles 18 have 3 hours to recharge, so the charging rate is 67 kW. However, during the peak hours extending between 2:00 pm to 8:00 pm when 3 vehicles 18 are simultaneously required, it is necessary for the controller 22 to schedule the recharging of some vehicles at a higher charging rate, for example 100 kW (vehicles W and Z). From 6:00 pm to 7:00 pm, the controller 22 instructs the charging station 20 to charge vehicle W during one hour at 200 kW.

Figure 11A:
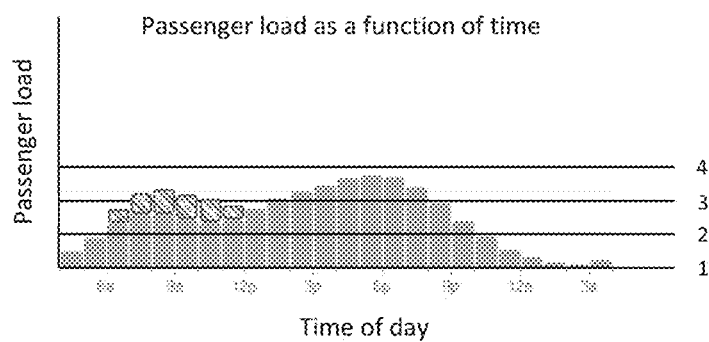
FIG. 11a is a graph of a forecasted passenger load as a function of time of day according to the principles of the present disclosure.
Figure 11B:
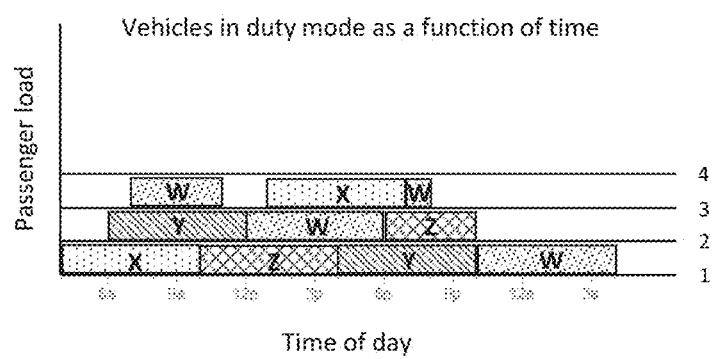

Because passenger load is not always 100% as predicted, the controller 22 may have to react to unplanned increase in passenger loads. This is shown in FIG. 11, now concurrently referred to, where a passenger load higher than forecasted by historical data is shown between 6:00 am and noon. FIG. 12, showing a timetable adjusted to suit the unplanned increased passenger load shown in FIG. 11. The raise in passenger load is first detected at 6:00 am, but it still does not require to send an additional vehicle 18 in duty mode. At that time, vehicles X and Y are in duty mode and vehicles W and Z are in idle mode. Vehicle W is not completely charged, but will be by 7:00 am. Vehicle Z is not yet charged, so it is not available yet for duty mode. The controller 22 then decides to send the vehicle W in duty mode at 7:00. Because the additional load of passengers does not decrease to the point where only 2 vehicles 18 in duty mode are required before 11:00 am and because 3 vehicles 18 in duty mode will again be required at 12:00 pm, the controller 22 orders vehicle W to leave duty mode and enter idle mode upon detecting a lower passenger load at 11:00 am. During that time, controller 22 must adjust the charging rate of vehicle X at 200 kW because it will have to leave its place at the charging station 20 to vehicle W when it briefly re-enters idle mode for one hour at 11:00 am. Then at 11:00 am, the controller 22 orders the charging station 20 to charge vehicle W at 200 kW also for one hour since it has to re-enter duty mode at noon. On the other hand, at noon, only vehicle Y is in idle mode until 16:00, so the controller 22 may order the charging station 20 to charge vehicle Y at a lower charging rate of 50 kW.

The present disclosure has been described with regard to preferred embodiments. The description as much as the drawings were intended to help the understanding of the disclosure, rather than to limit its scope. It will be apparent to one skilled in the art that various modifications may be made to the disclosure without departing from the scope of the disclosure as described herein, and such modifications are intended to be covered by the present description. The disclosure is defined by the claims that follow.

What is claimed is:

1. A method for managing a charging station for charging a battery of a connected autonomous electric vehicle for carrying passengers in a controlled environment, the method comprising:

accessing information about a passenger load as a function of time;

determining a forecasted time of start of duty mode based on the passenger load;

determining a duration between a time of start of charging the battery and the forecasted time of start of duty mode of the connected autonomous electric vehicle;

determining a charging rate, the charging rate being a function of the duration; and charging the battery of the connected autonomous electric vehicle at the determined charging rate.

2. The method of claim 1, wherein the passenger load is based on historical data.

3. The method of claim 1, further comprising determining the passenger load based on an image analysis of passengers circulating in an airport.

4. The method of claim 1, further comprising determining the passenger load based on passenger information of passengers flying aboard incoming flights.

5. The method of claim 4, wherein the determining the passenger load comprises selecting the passenger information from the group consisting of: flight number, arriving gate identification, destination, connection flight number, departing gate, quantity of passengers, and quantity of flight crew.

6. The method of claim 1, wherein the time of start of duty mode of the connected autonomous electric vehicle is a function of a vehicle passenger capacity.

7. The method of claim 1, wherein the charging the battery comprises using a charging rate that is proportional to the passenger load.

8. The method of claim 1, wherein the charging the battery comprises using a charging rate that is inversely proportional to the duration.

9. A system for controlling the charging of a battery of an autonomous electric vehicle, the system comprising:

a charging station adapted to charge the battery at a variable charging rate; and a controller, the controller being connected to the charging station, the controller being operative to determine and modulate the charging rate based on a duration between a time of start of charging the vehicle and a forecasted time of start of duty mode of the vehicle, the duration being determined by the controller based on a forecasted passenger load as a function of time.

10. The system of claim 9, wherein the controller is operative to increase the charging rate when the forecasted passenger load increases.

11. The system of claim 9, wherein the controller is operative to modulate the charging rate inversely proportionally to the duration.

12. The system of claim 9, further comprising a database containing historical data on the forecasted passenger load.

13. The system of claim 9, further comprising an image analysis system, the image analysis system being connected to the controller and to a camera system, the image analysis system being operative to determine the forecasted passenger load based on an image analysis of passengers circulating in an airport.

14. The system of claim 9, wherein the controller is operatively connected to receive information about travelers flying aboard incoming flights and to determine the forecasted passenger load based on the information.

15. A system for carrying passengers within a controlled environment, the system comprising:

a fleet of autonomous electric vehicles for carrying passengers, each vehicle of the fleet of autonomous electric vehicles having a battery, the fleet having:

at least one vehicle in duty mode, the at least one vehicle in duty mode being operative to carry passengers from a first area to a second area of the controlled environment;

at least one vehicle in idle mode;

a charging station, the at least one vehicle in idle mode being connected to the charging station for recharging its battery; and a controller connected to the charging station, wherein the controller is operative to modulate a charging rate used by the charging station for charging the battery of the at least one vehicle in idle mode, the charging rate being based on a duration between a time of start of a charging and a forecasted time of start of duty mode of the at least one vehicle in idle mode.

16. The system of claim 15, wherein the charging rate is inversely proportional to the duration.

17. The system of claim 15, wherein the controller is operative to determine the duration based on a forecasted load of passengers to be carried from the first area to the second area of the controlled environment as a function of time.

18. The system of claim 15, wherein the forecasted load of passengers is determined from historical data.

19. The system of claim 15, wherein the load of passengers is determined based on an image analysis of passengers circulating in an airport.

20. The system of claim 15, wherein the load of passengers is based on information about travelers flying aboard incoming flights.

* * * * *